(12) United States Patent
Howard

(10) Patent No.: US 11,598,897 B2
(45) Date of Patent: Mar. 7, 2023

(54) METHOD FOR OPERATING A METAL DETECTOR AND METAL DETECTOR

(71) Applicant: Mettler-Toledo Safeline Ltd., Manchester (GB)

(72) Inventor: Peter Howard, Shropshire (GB)

(73) Assignee: METTLER-TOLEDO SAFELINE LTD., Manchester (GB)

( * ) Notice: Subject to any disclaimer, the term of this patent is extended or adjusted under 35 U.S.C. 154(b) by 131 days.

(21) Appl. No.: 16/850,076

(22) Filed: Apr. 16, 2020

(65) Prior Publication Data
US 2020/0333497 A1 Oct. 22, 2020

(30) Foreign Application Priority Data

Apr. 17, 2019 (EP) ..................................... 19169829

(51) Int. Cl.
*G01V 3/10* (2006.01)
(52) U.S. Cl.
CPC .................................. *G01V 3/105* (2013.01)
(58) Field of Classification Search
None
See application file for complete search history.

(56) References Cited

U.S. PATENT DOCUMENTS

| | | |
|---|---|---|
| 2,995,699 A | 8/1961 | Charles et al. |
| 4,070,612 A | 1/1978 | Mcneill et al. |
| 5,691,640 A | 11/1997 | King |
| 5,892,692 A | 4/1999 | Whikehart et al. |
| 7,545,140 B2 | 6/2009 | Humphreys et al. |
| 8,587,301 B2 | 11/2013 | Derungs |
| 2003/0164766 A1 | 9/2003 | Britton |
| 2003/0184285 A1 | 10/2003 | Anderson et al. |
| 2005/0253711 A1 | 11/2005 | Nelson |
| 2007/0067123 A1 | 3/2007 | Jungerman |
| 2009/0045813 A1 | 2/2009 | Emery |

(Continued)

FOREIGN PATENT DOCUMENTS

| | | |
|---|---|---|
| EP | 2812734 B1 | 4/2018 |
| GB | 2361544 A | 10/2001 |
| WO | 2009144461 A2 | 12/2009 |

OTHER PUBLICATIONS

Moore John Colin et al.; Metal Detector; EP 2812734 B1; Apr. 11, 2018; G 01 V 13/00 (Year: 2018).*

(Continued)

*Primary Examiner* — Nasima Monsur
(74) *Attorney, Agent, or Firm* — Buchanan Ingersoll & Rooney PC

(57) ABSTRACT

A metal detector apparatus having a balanced coil system, a receiver unit, a drive coil with at least one capacitor forming a series resonant circuit connected to a transmitter unit having a converter, and a drive controller. The metal detector apparatus configuration generates a first square wave signal set to a fixed/selectable operating frequency which is applied to a first drive switch connected on one side to a first voltage potential and on another side to a centre tap of a half-bridge circuit. A second square wave signal set is generated to the fixed/selectable operating frequency and is applied to a second drive switch connected on one side to a second voltage potential and on another side to the centre tap, via which a drive current is supplied to the drive coil.

20 Claims, 3 Drawing Sheets

(56) References Cited

U.S. PATENT DOCUMENTS

| | | | | |
|---|---|---|---|---|
| 2009/0318098 A1* | 12/2009 | Stamatescu | ............ | G01V 3/104 |
| | | | | 455/118 |
| 2011/0163734 A1* | 7/2011 | Haevescher | ........... | G01R 27/26 |
| | | | | 324/76.11 |
| 2012/0086455 A1 | 4/2012 | McAdam | | |
| 2012/0206138 A1 | 8/2012 | Derungs | | |
| 2013/0338953 A1 | 12/2013 | Derungs | | |
| 2015/0234075 A1 | 8/2015 | Moore et al. | | |
| 2017/0097438 A1 | 4/2017 | Reime | | |
| 2017/0176364 A1 | 6/2017 | Lyon | | |
| 2017/0338695 A1* | 11/2017 | Port | ........................ | H02J 50/12 |
| 2017/0358954 A1* | 12/2017 | Ren | ......................... | H02J 50/12 |
| 2017/0371061 A1 | 12/2017 | Zhao | | |
| 2018/0172868 A1 | 6/2018 | Branson | | |
| 2020/0333499 A1 | 10/2020 | Ktistis | | |

OTHER PUBLICATIONS

Nutaq, "Digital I/Q demodulator with a high-speed ADC", https://www.nutaq.com/blog/digital-iq-demodulator-high-speed-adc, retrieved on Mar. 16, 2020, 5 pages.

Search Report dated Nov. 7, 2019, by the European Patent Office for Application No. 19169830.7.
Search Report dated Oct. 17, 2019, by the European Patent Office for Application No. 19169829.9.
Search Report dated Oct. 25, 2019, by the European Patent Office for Application No. 19169834.9.
Wikipedia, "atan2", https://en.wikipedia.org/wiki/Atan2, retrieved on Mar. 19, 2020, 5 pages.
Wikipedia, "Direct digital synthesis", https://en.wikipedia.org/wiki/Direct_digital_synthesis, retrieved on Mar. 16, 2020, 3 pages.
Wikipedia, "Rotation matrix", https://en.wikipedia.org/wiki/Rotation_matrix, retrieved on Mar. 19, 2020, 16 pages.
Wikipedia, CORDIC, https://en.wikipedia.org/wiki/CORDIC, retrieved on Mar. 16, 2020, 8 pages.
Notice of Allowability dated Nov. 20, 2020, by the U.S. Patent and Trademark Office in corresponding U.S. Appl. No. 16/850,166.
Office Action (Communication) dated Jul. 25, 2022, by the European Patent Office in corresponding European Patent Application No. 20 169 251.4-1001 (12 pages).
Office Action dated Jun. 23, 2022, by the U.S. Patent and Trademark Office in U.S. Appl. No. 16/850,489.

* cited by examiner

METHOD FOR OPERATING A METAL DETECTOR AND METAL DETECTOR

RELATED APPLICATION

This application claims priority under 35 U.S.C. § 119 to European Patent Application No. 19169829.9 filed in Europe on Apr. 17, 2019, the entire content of which is hereby incorporated by reference in its entirety.

FIELD

The present disclosure relates to a method for operating a metal detector that uses one or more operating frequencies and to a metal detector operating according to this method.

BACKGROUND INFORMATION

An industrial metal detection system as described for example in U.S. Pat. No. 8,587,301 B2, the disclosure of which is hereby incorporated herein by reference in its entirety, is used for detecting metal contamination in a product. When properly installed and operated, it will help reducing metal contamination and improving food safety. Most modern metal detectors utilise a search head comprising a "balanced coil system". Detectors of this design are capable of detecting all metal contaminant types including ferrous, nonferrous and stainless steels in a large variety of products such as fresh and frozen products.

A metal detector that operates according to the "balanced coil"-principle can include three coils, a drive coil and two identical detection coils that are wound onto a non-metallic frame, for example, each in parallel with the other. Since the detection coils which can enclose the drive coil centred in between are identical, an identical voltage is induced in each of them. In order to receive an output signal that is zero when the system is in balance, the first detection coil is connected in series with the second detection coil having an inversed sense of winding. Hence, the voltages induced in the detection coils, that are of identical amplitude and inverse polarity cancel out one another in the event that the system is in balance and no contaminant is present in an observed product.

However, as soon as a particle of metal passes through the coil arrangement, the electromagnetic field is disturbed first near one detection coil and then near the other detection coil. While the particle of metal is conveyed through the detection coils, the voltage induced in each detection coil is changed (e.g., by nano-volts). This change in balance results in a signal at the output of the detection coils that in a receiver unit is processed, amplified and subsequently used to detect the presence of the metal contaminant in the observed product.

In the receiver unit the input signal is normally split into an in-phase component and a quadrature component. The vector composed of these components has a magnitude and a phase angle, which is typical for the products and the contaminants that are conveyed through the coil system. In order to identify a metal contaminant, "product effects" need to be removed or reduced. If the phase of the product is known then the corresponding signal vector can be reduced so that a higher sensitivity results for the detection of signals originating from metal contaminants.

Methods applied for eliminating unwanted signals from the signal spectrum exploit the fact that metal contaminants, products and other disturbances have different influences on the magnetic field so that the detected signals differ in phase. Materials with a high conductivity cause signals with a higher negative reactive signal component and a smaller resistive signal component. Materials with a high magnetic permeability cause signals with a smaller resistive signal component and a higher positive reactive signal component. Signals caused by ferrite are primarily reactive, while signals caused by stainless steel are primarily resistive. Products, which are conductive, can cause signals with a strong negative reactive component. The phase angle of the signal vectors between the resistive signal component and reactive signal component remains normally constant, when a product or contaminant is conveyed through the metal detector.

US 2015/0234075 A1, the disclosure of which is incorporated herein by reference in its entirety, discloses a metal detector having a driver circuit for establishing an alternating magnetic field in a coil system so as to generate an output signal at a given frequency. The driver circuit has a central processing unit, an electronically programmable logic device (EPLD) and a driver connected to four field effect transistors forming a full wave bridge circuit across a chosen potential difference, with the drive coil connected across the output of the bridge circuit. The potential difference, e.g. 24 volts, establishes a drive current across the drive coil. US 2015/0234075 A1, the disclosure of which is incorporated herein by reference in its entirety, describes a half wave bridge with only two FETs. With the drive coil connected across both ends, the switching is arranged such that the drive current flows through one FET via the drive coil in one half cycle and through the other FET in the other half cycle.

Metal detectors can include coil system which operate on a broad band of frequencies. Alternatively coil systems can be used that are tuned to a specific operating frequency. The amplitude of the alternating current in the coil system is controlled by selecting the capacitance and the operating frequency accordingly. The inductance can only be altered in large steps due to that mechanical constraint of adding or subtracting single turns of the drive coil. Capacitors are relatively expensive, difficult to fit and are only available in sizes defined by the manufacturer. The transmitter frequency can also be adjusted with respect to the resonant frequency but requires a significant movement to produce the required change in current. Procedures to optimize a tuned coil system with its components to reach an operating frequency and a coil current that are in desired ranges is therefore cumbersome.

SUMMARY

A method is disclosed for operating a metal detector having a balanced coil system with two detection coils connected to a receiver unit and inductively coupled with a drive coil, which together with at least one capacitor form a series resonant circuit, the series resonant circuit being connected to a transmitter unit having a converter with a first drive switch and a second drive switch that form a half-bridge circuit, the method comprising: driving the series resonant circuit by a drive controller: in accordance with a first square wave signal (d1) that is set to a fixed or selectable operating frequency ($f_{TX}$) and is applied to the first drive switch, which is connected on one side to a first voltage potential ($V_D$) and on the other side to a centre tap of the half-bridge circuit; and in accordance with a second square wave signal (d2) that is set to the fixed or selectable operating frequency ($f_{TX}$) and is applied to the second drive switch, which is connected on one side to a second voltage potential ($V_S$) and on the other side to the same centre tap of the half-bridge circuit, via which a drive current ($i_D$) is supplied to the drive coil; providing the first voltage potential ($V_D$) and the second voltage potential ($V_S$) with different magnitudes with reference to ground; providing the first square wave signal (d1) with a variable first duty factor and the second square wave signal (d2) with a variable second duty factor in such a way that the first square wave signal (d1) and the second square wave signal (d2) are never active at a same time; and adjusting the first duty factor and the second duty factor to set a coil current ($i_{L61}$) in the drive coil to a value for operating the metal detector and for measuring contaminants.

A metal detector is disclosed, comprising: a balanced coil system with two detection coils; a receiver unit connected with the balanced coil system and inductively coupled with a drive coil, which together with at least one capacitor form a series resonant circuit; a transmitter connected with the series resonant circuit, the transmitter having a converter with a first drive switch and a second drive switch that form a half-bridge circuit; and a drive controller configured for generating and driving the series resonant circuit with: a first square wave signal (d1) that is set to a fixed or selectable operating frequency (fTX) for application to the first drive switch, which is connected on one side to a first voltage potential (VD) and on the other side to a centre tap of the half-bridge circuit; and a second square wave signal (d2) that is set to the fixed or selectable operating frequency (fTX) for application to the second drive switch, which is connected on one side to a second voltage potential (VS) and on the other side to the same centre tap of the half-bridge circuit, via which a drive current (iD) is supplied to the drive coil; wherein the first voltage potential (VD) and the second voltage potential (VS) are set to different magnitudes with reference to ground; wherein the first square wave signal (d1) is selected to have a variable first duty factor and the second square wave signal (d2) is selected to have a variable second duty factor selected such that the first square wave signal (d1) and the second square wave signal (d2) are never active at a same time; and wherein the drive controller is configured to adjust the first duty factor and the second duty factor to set a coil current (iL61) in the drive coil to a value for operating the metal detector and for measuring contaminants.

BRIEF DESCRIPTION OF THE DRAWINGS

Detailed aspects of the invention will be described below with reference to exemplary embodiments and the drawings, wherein.

DETAILED DESCRIPTION

Figure 1:
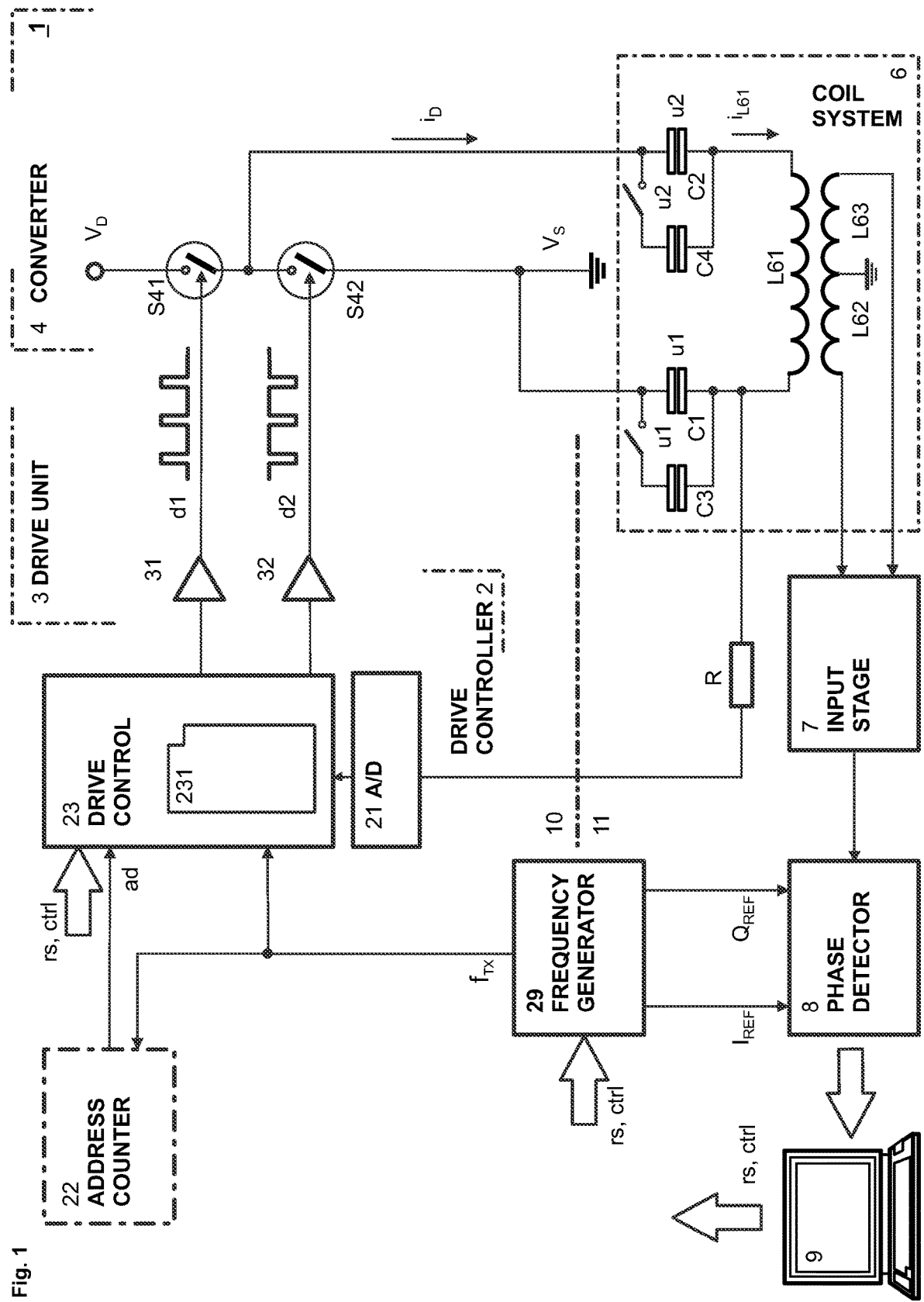
FIG. 1 shows an exemplary disclosed metal detector 1, which includes a converter 4 with two drive switches S41, S42 that form a half-bridge and that are controlled by means of drive signals d1, d2 provided by a drive controller 2 and that provide a drive current iD to a drive coil L61 of a coil system 6 of the metal detector 1, which together with capacitors C1 and C2 optionally in addition with capacitors C3 and C4 form a series resonant circuit.

The present disclosure provides an improved method for operating a metal detector and an improved metal detector operating according to this method.

An exemplary method as disclosed allows tuning a metal detector to desired operating frequencies and to set suitable maximum coil currents for each of these frequencies with little effort.

For example, exemplary embodiments make it possible to tune the metal detector to desired operating frequencies and to set suitable coil currents without requiring non-standard components. Disclosed metal detectors can be produced at reduced cost with optimum performance.

The disclosed method and metal detector allow generating high coil currents in the drive coil providing the metal detector with a high sensitivity, while currents in the transmitter unit remain comparably low so that the transmitter circuitry can be dimensioned accordingly, e.g. with reduced power performance and cost.

Still further, it is possible to operate the metal detector in tuned-mode dedicated to specific frequencies for which each the coil currents can easily be adjusted and in non-tuned-mode, in which operating frequencies can freely be selected without tuning the coil system.

Conversion between different modes of operation can easily be accomplished practically without the requirement of additional components.

In an exemplary first broad aspect there is provided a method for operating a metal detector that includes a balanced coil system with two detection coils connected to a receiver unit and inductively coupled with a drive coil, which together with at least one capacitor forms a series resonant circuit that is connected to a transmitter unit, which includes a converter with a first drive switch and a second drive switch that form a half-bridge circuit and that are driven by a drive controller:

in accordance with a first square wave signal that is set to a fixed or selectable operating frequency and is applied to the first drive switch, which is connected on one side to a first voltage potential and on the other side to a centre tap of the half-bridge circuit, and in accordance with a second square wave signal that is set to the fixed or selectable operating frequency and is applied to the second drive switch, which is connected on one side to a second voltage potential and on the other side to the centre tap of the half-bridge circuit, via which a drive current is supplied to the drive coil.

An exemplary method includes:

providing the first voltage potential and the second voltage potential with different magnitudes with reference to ground;

providing the first square wave signal with a variable first duty factor and the second square wave signal with a variable second duty factor in such a way that the first square wave signal and the second square wave signal are never active at the same time; and adjusting the first duty factor and the second duty factor to set the coil current in the drive coil to a value suitable for operating the metal detector and for measuring contaminants.

In an exemplary embodiment the first voltage potential or the second voltage potential is set to ground or ground potential respectively. Providing only one supply voltage in the converter is therefore sufficient for generating a coil current in the drive coil, which is adjustable to a suitable value by selecting corresponding values for the first duty factor and the second duty factor.

If the centre tap of the half-bridge circuit is connected by one of the drive switches to a voltage potential that is different from ground potential, then the drive current is driven through the series resonant circuit for example, to ground.

According to an exemplary disclosed method the first voltage potential and the second voltage potential are applied to the series resonant circuit for individual durations determined by the first duty factor and the second duty factor. The coil current in the drive coil can be increased by increasing the duty factor or duration in which within each period of the operating signal the voltage potential with the higher magnitude is applied to the drive coil and by decreasing the duty factor or duration in which within each period of the operating signal the voltage potential with the lower magnitude or with ground potential is applied to the drive coil.

Suitable exemplary first and second duty factors, which can be applied to the converter, can be calculated or programmed in the drive controller. Providing different voltage potentials in the converter, with which the coil current could also be influenced, can require considerable more efforts and is advantageously avoided.

The first square wave signal and the second square wave signal are for example, generated with waveforms that complement one another at least approximately so that the sum of the current first duty factor and the current second duty factor is approximately equal to "1". One end or terminal of the series resonant circuit is therefore for example, always connected to the first or to the second voltage potential, while the other end or terminal of the series resonant circuit is always connected to a fixed potential, for example, ground potential.

A duty factor is the fraction of one period of the operating signal, in which the signal is active. The active signal can also be defined as a pulse with the corresponding duration or fraction of one period of the operating signal. The duty factor for a periodic signal therefore expresses the ratio between an active duration and an inactive duration scaled to 1 rather than 100% as used for the term "duty cycle".

In a corresponding active time of one period of the operating signal, one end of the series resonant circuit is set to ground by closing the corresponding drive switch. If the other end of the series resonant circuit is fixedly set to ground, then the series resonant circuit is set within this active time with both ends to ground and is therefore forming a closed loop. Within this active time no energy is induced into the closed loop or series resonant circuit, while energy is lost due to thermal losses and the induction of energy into the detection coils. By increasing this active time or the related duty factor, the coil current in the drive coil can be reduced. By decreasing this active time or the related duty factor and by increasing the active time or the related duty factor for which the voltage potential with higher magnitude is applied to the series resonant circuit the coil current can be increased accordingly.

For example, the first duty factor and the second duty factor can be adjusted such that the coil current in the drive coil is set to a value for which voltages occurring in the series resonant circuit remain below a predetermined maximum value. Hence, the coil current is maximized up to a value for which the allowable voltage at the coil system is reached but not exceeded. By this measure, the sensitivity of the metal detector is optimized as well.

In an exemplary embodiment, the voltage occurring in the series resonant circuit or in the coil system is therefore measured and compared to a reference value, e.g. the maximum allowable coil voltage. By adjusting the first duty factor of the first square wave signal and the second duty factor of the second square wave signal, the difference between the measured voltage and the reference value can be kept at a minimum. In this way, a closed control loop can advantageously be formed, which keeps the maximum coil current and the maximum voltage in the coil system constant.

In order to reduce voltages occurring in the series resonant circuit or to increase the coil current while the maximum voltages occurring in the resonant circuit remains low, at least a first capacitor is arranged on one side of the drive coil and at least a second capacitor is arranged on the other side of the drive coil. The first capacitor and the second capacitor are for example, identical so that the voltages occurring in the series resonant circuit are equal and opposite on either side of the coil and at a minimum with reference to ground potential. The series resonant circuit is therefore balanced with reference to ground.

In an exemplary embodiment the capacitance or the inductance and therefore the resonant frequency of the series resonant circuit is adjustable. The capacitance can be changed by connecting or disconnecting a capacitor and that inductance can be changed by connecting or disconnecting a coil winding from the drive coil. For example, at least a third capacitor is provided that is connectable by a first switch to the at least one or first capacitor and/or at least a fourth capacitor is provided that is connectable by a second switch to the second capacitor. The first switch and/or the second switch are selectively opened or closed for changing the resonant frequency of the series resonant circuit to a desired value which is for example close to the operating frequency of the metal detector.

The fixed or selectable operating frequency is for example, set offset from the resonant frequency of the series resonant circuit in such a way that the coil current in the drive coil is adjustable within a current range, in which the coil current in the drive coil and/or voltages occurring in the series resonant circuit remain below predetermined maximum values. Alternatively the resonant frequency of the series resonant circuit is offset relative to the operating frequency of the fixed or selected operating frequency of the metal detector. By this measure excessive coil currents are avoided and coil voltages are kept within a range, in which they can be controlled by a closed loop.

The exemplary metal detector can operate with one or a plurality of operating frequencies for which the coil system is tuned in tuned-mode. Operating values for the first duty factor and the second duty factor, with which the coil current in the drive coil can be set to a suitable value for each selectable operating frequency, are for example, predetermined and stored or calculated online. One of the predetermined operating frequencies can then be selected together with the related operating values for the first duty factor and the second duty factor, so that for each selected operating frequency the desired maximum coil current and/or maximum coil voltage appears.

Still further, the metal detector can selectively be operated in tuned-mode as already described or in non-tuned-mode, in which the drive coil is not part of a resonant circuit. In tuned-mode, the drive coil together with at least one capacitor forms a series resonant circuit and is connected to the half-bridge circuit provided in the converter. In non-tuned mode, the drive coil is not part of a series resonant circuit and is connected to a full-bridge circuit provided in the converter.

In an exemplary embodiment the full-bridge circuit is convertible to the half-bridge circuit and vice versa. In tuned mode only the first half bridge circuit of the full-bridge circuit is switched while the second half bridge circuit connects the none-switched side of the coil to ground. In this way conversion can easily be affected without additional components. In non-tuned mode the centre taps of the first and second half bridge circuit of the full-bridge circuit are for example, directly connected with the ends or terminals of the drive coil. In tuned mode the centre tap of the first half bridge circuit of the full-bridge circuit is connected directly or indirectly to one of the terminals of the drive coil, while the other terminal of the drive coil is for example, set, directly or indirectly, to ground. In this manner the converter can easily be changed from operating in tuned-mode to operating in non-tuned-mode.

FIG. 1 shows an exemplary embodiment of a disclosed metal detector 1 that includes a transmitter unit 10 and a receiver unit 11 and a balanced coil system 6 with a drive coil L61 connected to the output of the transmitter unit 10 and two detection coils L62, L63 connected on one end to ground potential and with the other end to an input stage 7 of the receiver unit 11. In the input stage 7 the input signal is for example amplified and filtered and then forwarded to a phase detector module 8, which for example includes two phase detector units. The phase detector module 8, which receives an in-phase reference signal $I_{REF}$ and a quadrature reference signal $Q_{REF}$ from om a frequency generator or synthesizer 29, provides in-phase components and quadrature components of the baseband signals of products and contaminants. Demodulation with the in-phase reference signal $I_{REF}$ and the quadrature reference signal $Q_{REF}$ provides phase information and allows distinguishing between the phases of signals of different origin and obtaining information about the observed product and contaminants, if present. The phase detector module 8 provides the in-phase and quadrature signals to a control unit 9, which is for example, equipped with a signal processor, input output devices, a keyboard and a display. By means of the control unit 9 the operation of the metal detector 1 can be controlled. For example, operating conditions of the metal detector 1, particularly the drive current $I_D$ and the operating frequency can be selected as desired.

The transmitter unit 10 includes a drive controller 2, a drive unit 3 and a converter 4. The drive controller 2 includes a frequency generator or synthesizer 29, which is controlled by the main control unit 9 to produce a desired operating frequency $f_{TX}$ and corresponding in-phase reference signals $I_{REF}$ and quadrature reference signals $Q_{REF}$ that are applied to the phase detector module 8. The operating frequency is applied to the drive control unit 23, which provides drive signals d1, d2, such as a pulse-width modulated signals, which exhibit the operating frequency and duty factors set to generate a desired maximum coil current $i_{L61}$. In the drive unit 3 the drive signals d1, d2 are amplified by amplifiers 31, 32 and forwarded to the converter 4.

The converter 4 includes two drive switches S41, S42 that form a half-bridge and that are controlled by means of the drive signals d1, d2. The drive switches S41, S42 provide a drive current $i_D$ to the drive coil L61 of the coil system 6. Together with capacitors C1 and C2 the drive coil L61 forms a series resonant circuit. The resonant frequency of the series resonant circuit and the operating frequency of the metal detector 1 are for example, offset to one another. The resonant circuit, which includes (e.g., consists of) the capacitors C1 and C2 the drive coil L61, is connected with one end to ground and with the other end to the center tap of the half bridge circuit S41, S42 of the converter 4.

The first capacitor C1 is connected to one terminal of the drive coil L61 and the second capacitor C2 is connected to the other terminal of the drive coil L61. The resulting series resonant circuit is therefore balanced in view of the capacitors C1, C2 connected to the terminals of the drive coil L61. With a switch u1, a third capacitor C3 can be connected in parallel to the first capacitor C1 and with a switch u2 a fourth capacitor C4 can be connected in parallel to the second capacitor C2, so that the resonant frequency of the series resonant circuit can be set to a corresponding value. By adding or subtracting capacitors or coil windings the resonant frequency can be set to any desired value.

The first drive switch S41 of the half bridge circuit is connected with the upper end to voltage potential $V_D$ and with the lower end to the centre tap of the half bridge circuit. The second drive switch S42 is connected with the upper end to the center tap of the half bridge circuit and with the lower end to ground. In the active period of the first drive signal d1 the first drive switch S41 connects capacitor C2 or the related terminal of the series resonant circuit to voltage potential $V_D$. In this fraction of the related period of the operating frequency, the second drive switch S42 is open. In the next fraction of the related period of the operating frequency, the second drive switch S42 is closed. In this fraction capacitor C2 or the related terminal of the series resonant circuit is connected to ground. Consequently, in this fraction of the related period of the operating frequency, the resonant circuit is connected via capacitor C1 to ground and via capacitor C2 and the second drive switch S42 to ground and forms therefore a closed loop. In the first fraction of each period of the operating frequency energy is injected into the series resonant circuit, while in the second fraction of each period of the operating frequency no energy is added, but energy can be lost due to electrical resistances and due to the induction of a magnetic field in the detection coils L62, L63. By adjusting the ratio of the first and second fraction or the related duty factors of the first drive signal d1 and the second drive signal d2, the energy present in the resonant circuit and consequently the maximum coil current $i_{L61}$ and the voltages appearing at the capacitor C1 and C2 can be set to desired values.

In the drive control unit 23 the duty factors of the drive signals d1, d2 can be calculated by means of a control program 231 and/or retrieved from a memory module, in which data for duty factors for every selectable operating frequency and every coil current $i_{L61}$ for each operating frequency are stored. Addressed by an address counter 22, which delivers address information "ad" to the drive control unit 23, data for the duty factors can recursively be read out from memory. Alternatively, timers can be set to indicate the length of active periods within the periods of the operating signals for each drive signal d1, d2 are the duty factors are continuously calculated and adapted as required.

In this exemplary embodiment, voltages appearing in the series resonant circuit can be measured and converted in an A/D converter 21 to a digital value that is supplied to the drive control unit 23. The measured voltage can be compared with a reference value to determine a difference which is minimized by changing the duty factors of the drive signals d1, d2 accordingly. The drive control unit 23 can act as a PID controller, which based on the measured difference applies a correction based on proportional, integral, and derivative terms.

Figure 2:
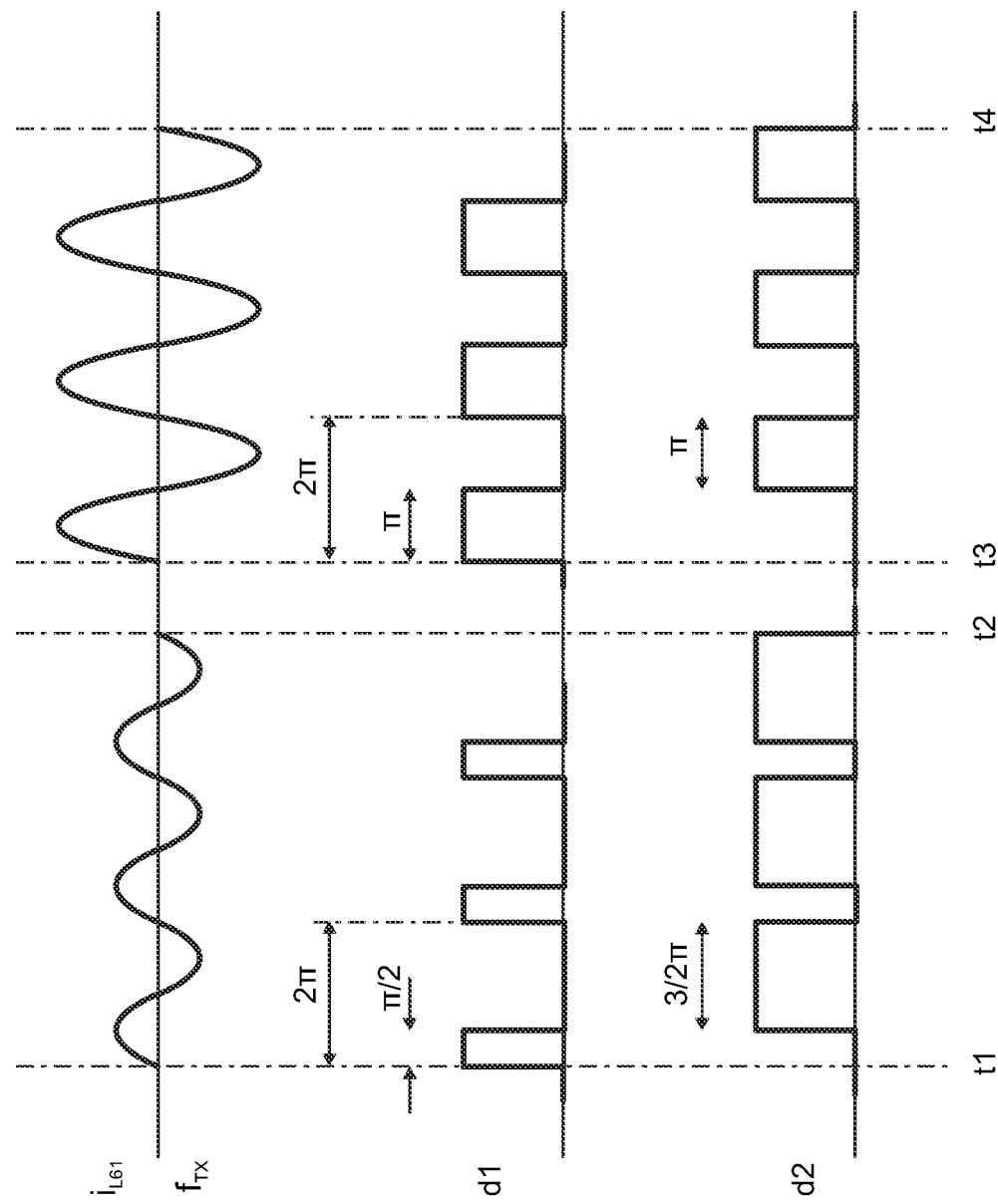
FIG. 2 shows examples of drive signals d1, d2 applied to the drive switches S41, S42 in the converter 4 of FIG. 1.

FIG. 2 shows examples of drive signals d1, d2 that are applied to the drive switches S41, S42 in the converter 4 of FIG. 1. From time t1 to t2 the first drive signal d1 has a duty factor of 0.25 or π/2 and the second drive signal d2 has a duty factor of 0.75 or 3π/2. The first drive signal d1 is active in the first fraction of the period of drive signal d1. The second drive signal is active in the second fraction of the period of the drive signal d2. The length of the first fraction and the length of the second fraction of the first and second drive signal corresponds total to the length of a full period 2π of the drive signals d1, d2. Since the active fraction of the first drive signal d1 is relatively short and the series resonant circuit is connected to the drive voltage $V_D$ only for short periods of time, the coil current $i_{L61}$ is comparably small.

From time t3 to t4 the duty factors of the first and the second drive signal d1, d2 are set to 0.5 or π. For one half of the period 2π the series resonant circuit is therefore connected to the drive voltage $V_D$ and for the other half of the period 2π the series resonant circuit is connected to ground. In this time interval, the energy in the series resonant circuit and the occurring maximum coil current $i_{L61}$ is increased accordingly.

Figure 3:
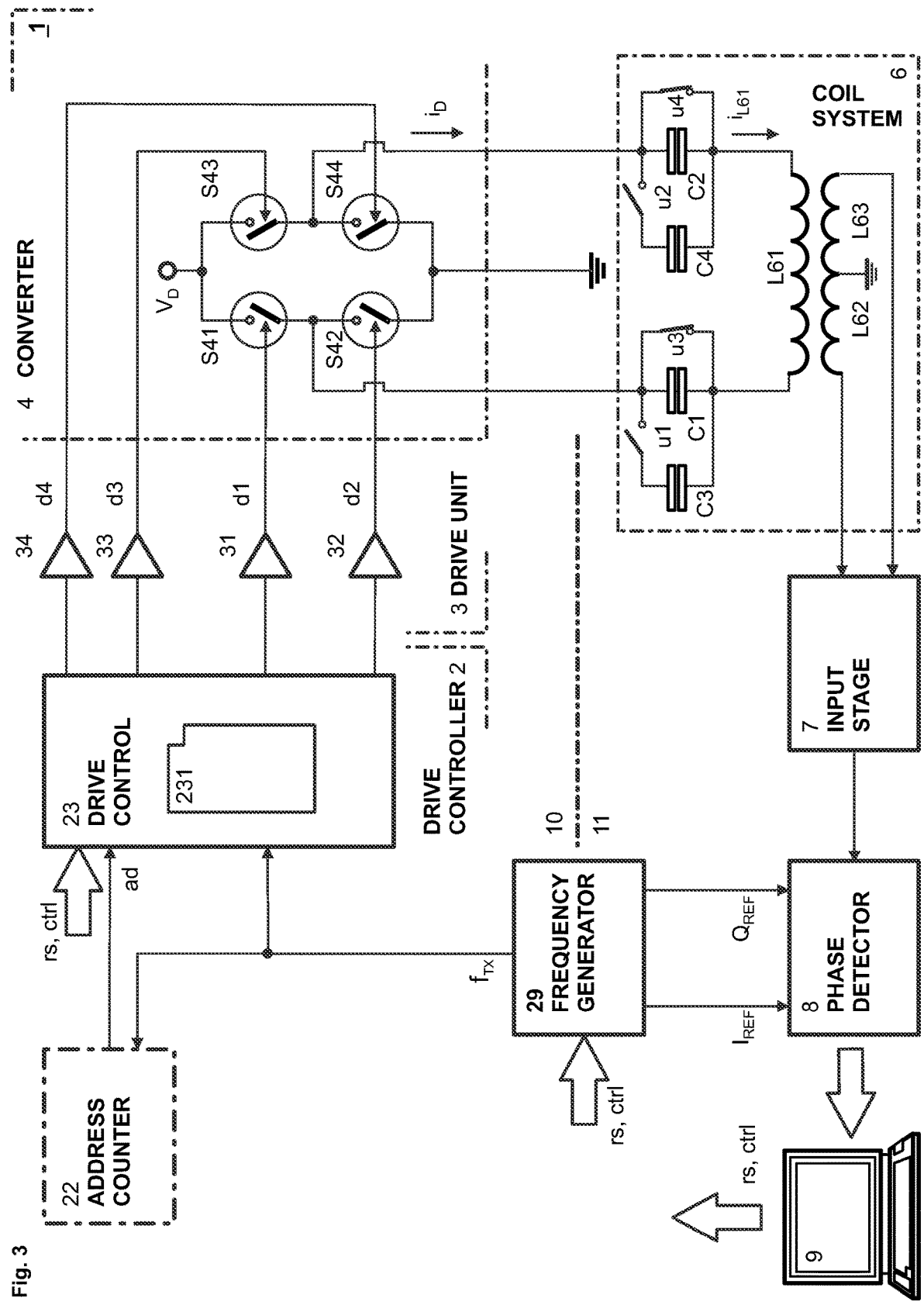
FIG. 3 shows the metal detector 1 of FIG. 1 with an exemplary converter 4 that includes a full-bridge circuit with drive switches S41, S42 forming a first half bridge circuit and drive switches S43, S44 forming a second half bridge circuit that is activated in non-tuned-mode and is deactivated in tuned-mode, in which the first half bridge circuit is operated as described with reference to FIG. 1.

FIG. 3 shows the metal detector 1 of FIG. 1 with a converter 4 that includes a full-bridge circuit with four drive switches S41, S42, S43, S44, which receive each a drive signal d1, d2, d3, d4 from the drive unit 3. The full-bridge circuit includes a first half bridge circuit with drive switches S41 and S42 and a second half bridge circuit with drive switches S43 and S44. In non-tuned-mode the complete full-bridge circuit with the first half bridge circuit and the second half bridge circuit is active. In tuned-mode, only the first half bridge circuit of the full-bridge circuit is active, while the drive switch S43 of the second half bridge circuit remains open and S44 will remain closed.

In non-tuned-mode the capacitors C1 and C2 are short-circuited by switches u3 and u4. One terminal of the drive coil L61 is connected to the center tap of the first half bridge circuit and the other terminal of the drive coil L61 is connected to the center tap of the second half bridge circuit. In this configuration the full-bridge circuit can be operated with the drive signals d1, d2, d3, d4 to generate any frequency at a time or multiple frequencies at the time.

By changing the switch settings of switches u3 and u4 and by opening the drive switches S43 and closing S44 of the second half-bridge circuit the converter 4 can be reconfigured as shown in FIG. 1. In this state only the 1$^{st}$ half bridge circuit with drive switches S41 and S42 is active. One terminal of the drive coil L61 is connected to the center tap of the first half bridge circuit and the other terminal of the drive coil L61 is connected via S44 to ground. In this configuration the half-bridge circuit is operated as described with reference to FIG. 1.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS LIST 1 metal detector
10 transmitter unit
11 receiver unit
2 drive controller
21 A/D converter
22 address counter
23 drive control unit
231 control program
29 frequency generator
3 drive unit
31, 32, 33, 34 amplifiers
4 converter
S41, S42, S43, S44 drive switches
6 (balanced) coil system
L61 drive coil
L62, L63 detection coils
7 input stage
8 phase detector unit
9 control unit/computer system
ad address signal
C1, C2, C3, C4 capacitors connected/connectable to the drive coil
u1, u2 switches for changing the resonance frequency
u3, u4, switches for changing the mode of operation
d1, d2 drive signals
$f_{TX}$ operating frequency
$f_{D1}$, $f_{D2}$ frequency components
$i_D$ drive current
$i_{L61}$ coil current
$V_D$ first voltage potential, first drive voltage
$V_S$ second voltage potential, second voltage or ground

The invention claimed is:

1. A method for operating a metal detector having a balanced coil system with two detection coils connected to a receiver unit and inductively coupled with a drive coil, which together with at least one capacitor form a series resonant circuit, the series resonant circuit being connected to a transmitter unit having a converter with a first drive switch and a second drive switch that form a half-bridge circuit, the method comprising:
   driving the series resonant circuit by a drive controller:
      in accordance with a first square wave signal (d1) that is set to a fixed operating frequency ($f_{TX}$) and is applied to the first drive switch, which is connected on one side to a first voltage potential ($V_D$) and on the other side to a centre tap of the half-bridge circuit; and
      in accordance with a second square wave signal (d2) that is set to the fixed operating frequency ($f_{TX}$) and is applied to the second drive switch, which is connected on one side to a second voltage potential ($V_S$) and on the other side to the same centre tap of the half-bridge circuit, via which a drive current ($i_D$) is supplied to the drive coil;
   providing the first voltage potential ($V_D$) and the second voltage potential ($V_S$) with different magnitudes with reference to ground;
   providing the first square wave signal (d1) with a variable first duty factor and the second square wave signal (d2) with a variable second duty factor in such a way that the first square wave signal (d1) and the second square wave signal (d2) are never active at a same time; and
   adjusting the first duty factor and the second duty factor to set a coil current ($i_{L61}$) in the drive coil to a value for operating the metal detector at the fixed operating frequency ($f_{TX}$) and for measuring contaminants.

2. The method for operating a metal detector according to claim 1, wherein at least one of the first voltage potential ($V_D$) or the second voltage potential ($V_S$) is set to ground.

3. The method for operating a metal detector according to claim 1, comprising:
   generating the first square wave signal (d1) and the second square wave signal (d2) with waveforms that complement one another at least approximately so that a sum of the current first duty factor and the current second duty factor is approximately equal to 1.

4. The method for operating a metal detector according to claim 1, comprising:
   adjusting the first duty factor and the second duty factor to set the coil current ($i_{L61}$) in the drive coil to a value for which voltages occurring in the series resonant circuit remain below a predetermined maximum value.

5. The method for operating a metal detector according to claim 1, comprising:
   driving the drive current ($i_D$) from the centre tap of the half-bridge circuit through the series resonant circuit to ground.

6. The method for operating a metal detector according to claim 1, comprising:
   arranging at least a first capacitor (C1) on one side of the drive coil and at least a second capacitor (C2) on the other side of the drive coil, and wherein the first capacitor (C1) and the second capacitor (C2) are identical.

7. The method for operating a metal detector according to claim 6, comprising at least one of:
   providing at least one of a third capacitor (C3) that is connectable by a first capacitor switch (u1) to the first capacitor (C1); or
   providing at least one fourth capacitor (C4) that is connectable by a second capacitor switch (u2) to the second capacitor (C2), the method including:
   closing or opening at least one of the first capacitor switch (u1) or the second capacitor switch (u2) for changing the resonant frequency of the series resonant circuit.

8. The method for operating a metal detector according to claim 1, comprising:
   setting the fixed operating frequency ($f_{TX}$) offset from the resonant frequency of the series resonant circuit in such a way that at least one of:
   coil current ($i_{L61}$) in the drive coil is adjustable within a current range; or
   voltages occurring in the series resonant circuit remain below predetermined maximum values.

9. The method for operating a metal detector according to claim 1, comprising:
   measuring a voltage at a capacitor (C1, C2) of the series resonant circuit;
   comparing the measured voltage with a reference value; and
   adjusting the first duty factor of the first square wave signal (d2) and second duty factor of the second square wave signal (d2) in accordance with a difference between the measured voltage and the reference value, which corresponds to a predetermined value of the coil current ($i_{L61}$) in the drive coil.

10. The method for operating a metal detector according to claim 9, comprising:
    determining operating values for the first duty factor and the second duty factor to set the coil current ($i_{L61}$) in the drive coil to a value for the fixed operating frequency ($f_{TX}$); and
    selecting the operating frequency ($f_{TX}$) together with the related operating values for the first duty factor and the second duty factor.

11. The method for operating a metal detector according to claim 1, comprising at least one of:
    operating the coil system in tuned-mode, in which the drive coil together with the at least one capacitor (C1, C2) forms a series resonant circuit and is connected to the half-bridge circuit; or
    operating the coil system in non-tuned mode, in which the drive coil is not part of a series resonant circuit and is connected to a full-bridge circuit, which is configured to be convertible to the half-bridge circuit.

12. The method for operating a metal detector according to claim 2, comprising:
    generating the first square wave signal (d1) and the second square wave signal (d2) with waveforms that complement one another at least approximately so that a sum of the current first duty factor and the current second duty factor is approximately equal to 1.

13. The method for operating a metal detector according to claim 12, comprising:
    adjusting the first duty factor and the second duty factor to set the coil current (iL61) in the drive coil to a value for which voltages occurring in the series resonant circuit remain below a predetermined maximum value.

14. The method for operating a metal detector according to claim 13, comprising;
    driving the drive current (iD) from the centre tap of the half-bridge circuit through the series resonant circuit to ground.

15. The method for operating a metal detector according to claim 14, comprising:
    arranging at least a first capacitor (C1) on one side of the drive coil and at least a second capacitor (C2) on the other side of the drive coil, and wherein the first capacitor (C1) and the second capacitor (C2) are identical.

16. The method for operating a metal detector according to claim 15 comprising at least one of;
    providing at least one of a third capacitor (C3) that is connectable by a first capacitor switch to the at least one or first capacitor (C1); or
    providing at least a fourth capacitor (C4) that is connectable by a second capacitor switch (u2) to the second capacitor (C2), the method including:
    closing or opening at least one of the first capacitor switch (u1) or the second capacitor switch (u2) for changing the resonant frequency of the series resonant circuit.

17. A metal detector, comprising:
    a balanced coil system with two detection coils;
    a receiver unit connected with the balanced coil system and inductively coupled with a drive coil, which together with at least one capacitor form a series resonant circuit;
    a transmitter connected with the series resonant circuit, the transmitter having a converter with a first drive switch and a second drive switch that form a half-bridge circuit; and
    a drive controller configured for generating and driving the series resonant circuit with:
    a first square wave signal (d1) that is set to a fixed operating frequency ($f_{TX}$) for application to the first drive switch, which is connected on one side to a first voltage potential ($V_D$) and on the other side to a centre tap of the half-bridge circuit; and
    a second square wave signal (d2) that is set to the fixed operating frequency ($f_{TX}$) for application to the second drive switch, which is connected on one side to a second voltage potential ($V_S$) and on the other side to the same centre tap of the half-bridge circuit, via which a drive current ($i_D$) is supplied to the drive coil;

wherein the first voltage potential ($V_D$) and the second voltage potential ($V_S$) are set to different magnitudes with reference to ground;

wherein the first square wave signal (d1) is selected to have a variable first duty factor and the second square wave signal (d2) is selected to have a variable second duty factor selected such that the first square wave signal (d1) and the second square wave signal (d2) are never active at a same time; and wherein the drive controller is configured to adjust the first duty factor and the second duty factor to set a coil current ($i_{L61}$) in the drive coil to a value for operating the metal detector at the fixed operating frequency ($f_{TX}$) and for measuring contaminants.

18. The metal detector according to claim 17, comprising: wherein the first voltage potential ($V_D$) or the second voltage potential ($V_S$) is set to ground.

19. The metal detector according to claim 18, wherein the converter is configured to be convertible from a half-bridge circuit, having the first drive switch and the second drive switch to a full-bridge circuit which comprises:
a first half-bridge circuit with the first drive switch and the second drive switch, and a second half-bridge circuit with a third drive switch and a fourth drive switch.

20. The metal detector according to claim 17, wherein the converter is configured to be convertible from a half-bridge circuit, having the first drive switch and the second drive switch to a full-bridge circuit which comprises:
a first half-bridge circuit with the first drive switch and the second drive switch, and a second half-bridge circuit with a third drive switch and a fourth drive switch.

* * * * *